(12) United States Patent
Tong et al.

(10) Patent No.: US 8,037,428 B2
(45) Date of Patent: Oct. 11, 2011

(54) METHOD AND SYSTEM FOR POST-ROUTING LITHOGRAPHY-HOTSPOT CORRECTION OF A LAYOUT

(75) Inventors: Yang-Shan Tong, Chung-ho (TW); Daniel Zhang, Milpitas, CA (US); Linni Wei, Mountain View, CA (US); Alex Miloslavsky, Sunnyvale, CA (US); Wei-Chih Tseng, Fremont, CA (US); Zongwu Tang, Pleasanton, CA (US)

(73) Assignee: Synopsys, Inc., Mountain View, CA (US)

( * ) Notice: Subject to any disclaimer, the term of this patent is extended or adjusted under 35 U.S.C. 154(b) by 683 days.

(21) Appl. No.: 12/129,617

(22) Filed: May 29, 2008

(65) Prior Publication Data
US 2009/0300561 A1 Dec. 3, 2009

(51) Int. Cl.
*G06F 17/50* (2006.01)
(52) U.S. Cl. ............................................ 716/51; 716/52
(58) Field of Classification Search .......... 716/105–106, 716/50–56, 110–112
See application file for complete search history.

(56) References Cited

U.S. PATENT DOCUMENTS

| | | | | |
|---|---|---|---|---|
| 6,189,131 | B1 * | 2/2001 | Graef et al. | 716/113 |
| 7,240,305 | B2 * | 7/2007 | Lippincott | 716/52 |
| 7,861,203 | B2 * | 12/2010 | White et al. | 716/129 |

* cited by examiner

*Primary Examiner* — Jack Chiang
*Assistant Examiner* — Binh Tat
(74) *Attorney, Agent, or Firm* — Park, Vaughan, Fleming & Dowler LLP (57) ABSTRACT

One embodiment of the present invention provides a system that verifies an integrated circuit (IC) chip layout. During operation, the system receives a layout of an IC chip after the layout has gone through a place-and-route operation. Next, the system performs a lithography compliance checking (LCC) operation on the layout to detect lithography hotspots within the layout, wherein each lithography hotspot is associated with a local routing pattern around the lithography hotspot. Next, for each detected lithography hotspot, the system compares the associated local routing pattern against a hotspot database to determine if the local routing pattern matches an entry in the hotspot database, which stores a set of known hotspot configurations. If so, the system corrects the lithography hotspot using correction guidance information associated with the hotspot configuration stored in the hotspot database. Otherwise, the system corrects the lithography hotspot by performing a local rip-up and reroute on the local routing pattern, iteratively, until achieving convergence or given number of iterations.

24 Claims, 6 Drawing Sheets

METHOD AND SYSTEM FOR POST-ROUTING LITHOGRAPHY-HOTSPOT CORRECTION OF A LAYOUT

BACKGROUND

1. Field of the Invention

Embodiments of the present invention generally relate to semiconductor manufacturing. More specifically, embodiments of the present invention relate to a method and a system for identifying and correcting locations in a routed layout of an integrated circuit (IC) chip that are susceptible to lithography errors.

2. Related Art

Advances in IC manufacturing technology have enabled minimum feature sizes on IC chips to continuously decrease. Meanwhile, manufacturability-aware physical design, which takes into account both yield and reliability during the physical-design process, is becoming increasingly important in bridging the gap between design and manufacturing for nanometer-scale fabrication processes. Many yield and reliability issues can be attributed to certain layout configurations, referred to as "process-hotspots" or "hotspots," which are susceptible to process issues, such as stress and lithographic process fluctuations. It is therefore desirable to identify and remove these process-hotspot configurations and replace them with more yield-friendly configurations.

One of the main yield limiters is the increasing number of lithography "hotspots" that arise from the complexity of design layouts as technology nodes shrink to 65 nm and below. Although it is possible to deal with these lithography hotspots ("litho-hotspots" hereafter) during the resolution enhancement technology and optical proximity correction (RET/OPC) stage of the design cycle, it is becoming increasingly desirable to eliminate these litho-hotspots earlier in the design cycle (i.e., during or right after the physical design stage) because the RET/OPC stage has a heavy computational burden and little margin to effectively eliminate these lithography hotspots.

Conventionally, layout designers use manufacturer-provided design rules to represent litho-hotspots. A typical design rule checker can detect such litho-hotspots within the layout, which facilitates making corrections to the litho-hotspots to be compliant with the rules. However, this purely rule-based detection and correction approach has the drawback of introducing large number of false alarms. This drawback has become even more prominent as design rules become more numerous for sub-65 nm IC designs.

Another technique for detecting and correcting litho-hotspots involves manually fixing the hotspots by trial and error while using limited correction guidance information without taking into account the design rules. However, it is difficult to achieve a rapid and high-percentage correction convergence using this manual correction approach. Moreover, designers already have very limited time which makes such labor-intensive manual effort impractical.

Hence, what is needed is an automated and highly accurate litho-hotspot detection and correction technique which can be applied early in the IC design cycle.

SUMMARY

One embodiment of the present invention provides a system that verifies an integrated circuit (IC) chip layout. During operation, the system receives a layout of an IC chip after the layout has gone through a place-and-route operation. Next, the system performs a lithography compliance checking (LCC) operation on the layout to detect lithography hotspots within the layout, wherein each lithography hotspot is associated with a local routing pattern around the lithography hotspot. Next, for each detected lithography hotspot, the system compares the associated local routing pattern against a hotspot database to determine if the local routing pattern matches an entry in the hotspot database, which stores a set of known hotspot configurations. If so, the system corrects the lithography hotspot using correction guidance information associated with the hotspot configuration stored in the hotspot database. Otherwise, the system corrects the lithography hotspot by performing a local rip-up and reroute on the local routing pattern.

In a variation on this embodiment, the system generates a set of bounding boxes within the layout based on locations of the detected lithography hotspots and locations of existing design-rule checking (DRC) violations. The system then associates each detected lithography hotspot with a bounding box in the set bounding boxes which encloses the associated local routing pattern.

In a variation on this embodiment, the system determines if the lithography hotspot matches an entry in the hotspot database by performing a pattern-matching operation between the associated local routing pattern and each of the known hotspot configurations in the hotspot database.

In a variation on this embodiment, the system corrects the lithography hotspot using the correction guidance information by first identifying one or more polygons within the associated local routing pattern which cause the lithography hotspot. The system then modifies the polygons to form a new routing pattern around the lithography hotspot while maintaining signal connectivity of the layout.

In a variation on this embodiment, while correcting the lithography hotspot using the correction guidance information, the system performs a design-rule checking (DRC) operation on the new routing pattern to prevent DRC violations resulting from the correction.

In a further variation on this embodiment, the system modifies the polygons to form the new routing pattern can include: modifying the positions of the polygons, modifying the sizes of the polygons; creating one or more new polygons, and removing one or more of the existing polygons.

In a variation on this embodiment, the system corrects the lithography hotspot by: creating one or more fixed polygons in the local routing pattern to cause a DRC-rule violation on the lithography hotspot; using a router to perform one or more rip-up and reroute cycles on shapes in the local routing pattern that violate the DRC rules; removing the one or more fixed polygons; and unmarking the DRC-rule violation on the rerouted local routing pattern.

In a further variation, after correcting the lithography hotspot using either the correction guidance information or by performing the local rip-up and reroute, the system performs a new LCC operation within the bounding box containing the corrected lithography hotspot to determine if the bounding box is free of lithography hotspots. If so, the system marks the bounding box as an LCC-clean region which does not contain a lithography hotspot. Otherwise, the system initiates a new lithography hotspot correction cycle for each remaining lithography hotspot within the bounding box.

In a further variation, after marking the bounding box as an LCC-clean region, the system performs a DRC operation on the bounding box to determine if the bounding box is DRC-clean. If so, the system marks the bounding box as a DRC-clean region. Otherwise, the system repeats the local rip-up and reroute operation on the bounding box.

In a variation on this embodiment, the system uses an iterative process to perform an incremental correction on the lithography hotspot until the lithography hotspot is removed from the layout.

In a variation on this embodiment, the system performs parallel correction operations on multiple detected lithography hotspots.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Figure 1:
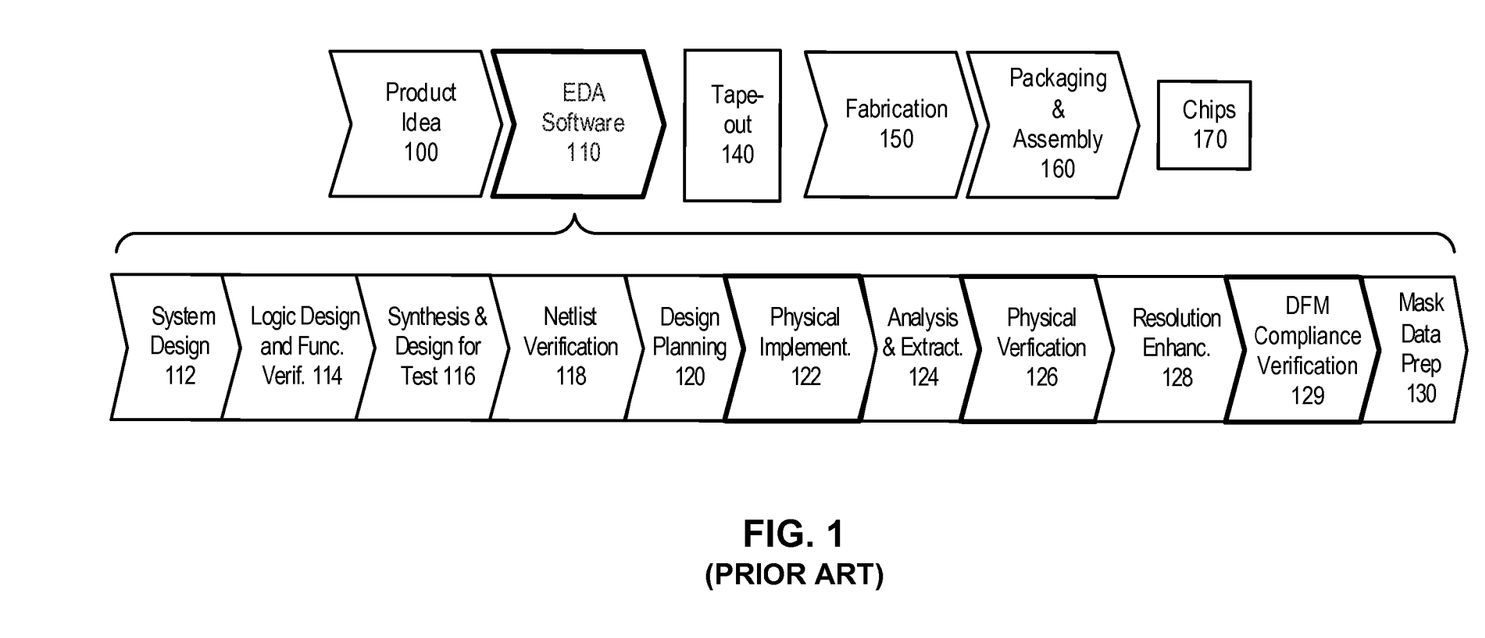
FIG. 1 illustrates various stages in the design and fabrication of an integrated circuit.

FIG. 1 illustrates various stages in the design and fabrication of an integrated circuit. The process starts with the generation of a product idea (stage 100), which is realized using an Electronic Design Automation (EDA) software design process (stage 110). When the design is finalized, it can be taped-out (stage 140). After tape-out, the fabrication process is consummated (stage 150) and packaging and assembly processes (stage 160) are performed which ultimately result in finished chips (stage 170).

The EDA software design process (stage 110), in turn, comprises stages 112-130, which are described below. Note that this design flow description is for illustration purposes only. This description is not meant to limit the present invention. For example, an actual integrated circuit design may require a designer to perform the design stages in a different sequence than the sequence described herein. The following discussion provides further details of the stages in the design process.

System design (stage 112): The designers describe the functionality to implement. They can also perform what-if planning to refine the functionality and to check costs. Hardware-software architecture partitioning can occur at this stage. Exemplary EDA software products from SYNOPSYS, INC. that can be used at this stage include MODEL ARCHITECT®, SABER®, SYSTEM STUDIO®, and DESIGNWARE® products.

Logic design and functional verification (stage 114): At this stage, the VHDL or Verilog code for modules in the system is written and the design is checked for functional accuracy. More specifically, the design is checked to ensure that it produces the correct outputs. Exemplary EDA software products from SYNOPSYS, INC. that can be used at this stage include VCS®, VERA®, DESIGNWARE®, MAGELLAN®, FORMALITY®, ESP® and LEDA® products.

Synthesis and design (stage 116): Here, the VHDL/Verilog is translated to a netlist. The netlist can be optimized for the target technology. Additionally, tests can be designed and implemented to check the finished chips. Exemplary EDA software products from SYNOPSYS, INC. that can be used at this stage include DESIGN COMPILER®, PHYSICAL COMPILER®, TEST COMPILER®, POWER COMPILER®, FPGA COMPILER®, TETRAMAX®, and DESIGNWARE® products.

Netlist verification (stage 118): At this stage, the netlist is checked for compliance with timing constraints and for correspondence with the VHDL/Verilog source code. Exemplary EDA software products from SYNOPSYS, INC. that can be used at this stage include FORMALITY®, PRIMETIME®, and VCS® products.

Design planning (stage 120): Here, an overall floor plan for the chip is constructed and analyzed for timing and top-level routing. Exemplary EDA software products from SYNOPSYS, INC. that can be used at this stage include ASTRO® and IC COMPILER® products.

Physical implementation (stage 122): The placement (positioning of circuit elements) and routing (connection of the same) occurs at this stage. Exemplary EDA software products from SYNOPSYS, INC. that can be used at this stage include the ASTRO® and IC COMPILER® products.

Analysis and extraction (stage 124): At this stage, the circuit function is verified at a transistor level; this in turn permits what-if refinement. Exemplary EDA software products from SYNOPSYS, INC. that can be used at this stage include ASTRORAIL®, PRIMERAIL®, PRIMETIME®, and STAR RC/XT® products.

Physical verification (stage 126): In this stage, the design is checked to ensure correctness for manufacturing, electrical issues, lithographic issues, and circuitry. Exemplary EDA software products from SYNOPSYS, INC. that can be used at this stage include the HERCULES® product.

Resolution enhancement (stage 128): This stage involves geometric manipulations of the layout to improve manufacturability of the design. Exemplary EDA software products from SYNOPSYS, INC. that can be used at this stage include PROTEUS®, PROTEUS®AF, and PSMGED® products.

DFM compliance verification (stage 129): In this stage, the design (mask layout) is checked to ensure correctness for manufacturing, electrical issues, mechanical stress issues, lithographic issues, and circuitry. Exemplary EDA software products from SYNOPSYS, INC. that can be used at this stage include the PRIMEYIELD®, SIVL®, and SEISMOS® products.

Mask data preparation (stage 130): This stage provides the "tape-out" data for production of masks to produce finished chips. Exemplary EDA software products from SYNOPSYS, INC. that can be used at this stage include the CATS® family of products.

Embodiments of the present invention can be used during one or more of the above-described stages. Specifically, one embodiment of the present invention can be used during physical implementation stage 122, physical verification stage 126, and DFM compliance verification stage 129.

Process of Detecting Lithography Hotspots within a Layout

Figure 2A:
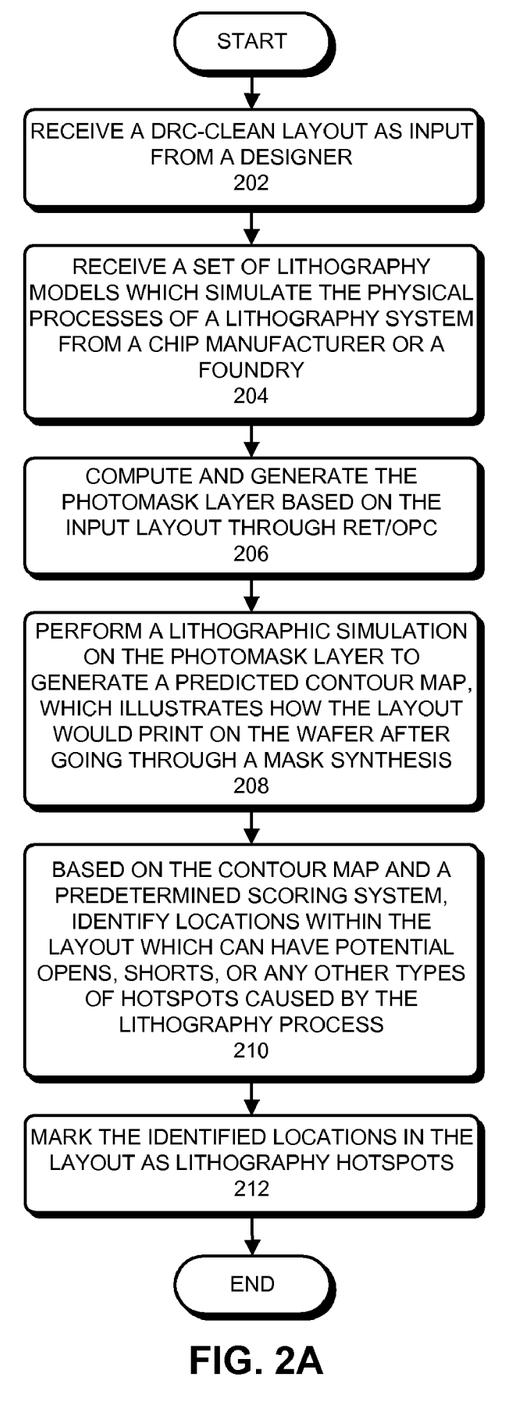
FIG. 2A presents a flowchart illustrating the process of detecting lithography hotspots within a layout in accordance with an embodiment of the present invention.

FIG. 2A presents a flowchart illustrating the process of detecting lithography hotspots within a layout in accordance with an embodiment of the present invention.

During operation, the system receives a DRC-clean layout as input from a designer (step 202). In one embodiment, the received layout is a placed-and-routed layout from the output of the physical implementation stage 122 in FIG. 1. Note that in some embodiments, DRC-clean is not required for the received layout. However, a DRC-clean layout can facilitate achieving better error convergence and minimizing runtime in the subsequent hotspot correction processes. Note that some DFM-related post-routing operations may be performed on the received layout prior to step 202. These post-routing operations can include, but are limited to, a dummy metal fill operation, a redundant-via insertion operation, a wire-spreading operation, and a widening operation.

The system additionally receives a set of lithography models which simulate the physical processes of a lithography system from a chip manufacturer or a foundry (step 204). In some embodiments, the system also receives OPC recipe specifications from the foundry. The system then computes and generates the photomask layer based on the input layout through a resolution enhancement/optical proximity correction (RET/OPC) process (step 206).

Next, the system performs a lithographic simulation on the photomask layer to generate a predicted contour map for the layout, wherein the predicted contour map illustrates how the layout would print on the wafer after going through a mask synthesis (step 208). Next, based on the predicted contour map and a predetermined scoring system, the system identifies locations within the layout which can have potential opens, shorts, or any other types of hotspots caused by the lithography process (step 210). The system subsequently marks these identified locations in the layout as lithography hotspots ("litho-hotspot" hereafter) (step 212). Note that the above-described process of identifying the lithography hotspots can be referred to as a "lithography constraint checking (LCC) process" or "LCC verification." In one embodiment of the present invention, the LCC process for detecting litho-hotspots is performed during or after physical implementation stage 122 but prior to the physical verification stage 126 in FIG. 1. In one embodiment, the LCC process may be implemented by using the PrimeYield LCC® tool.

Figure 2B:
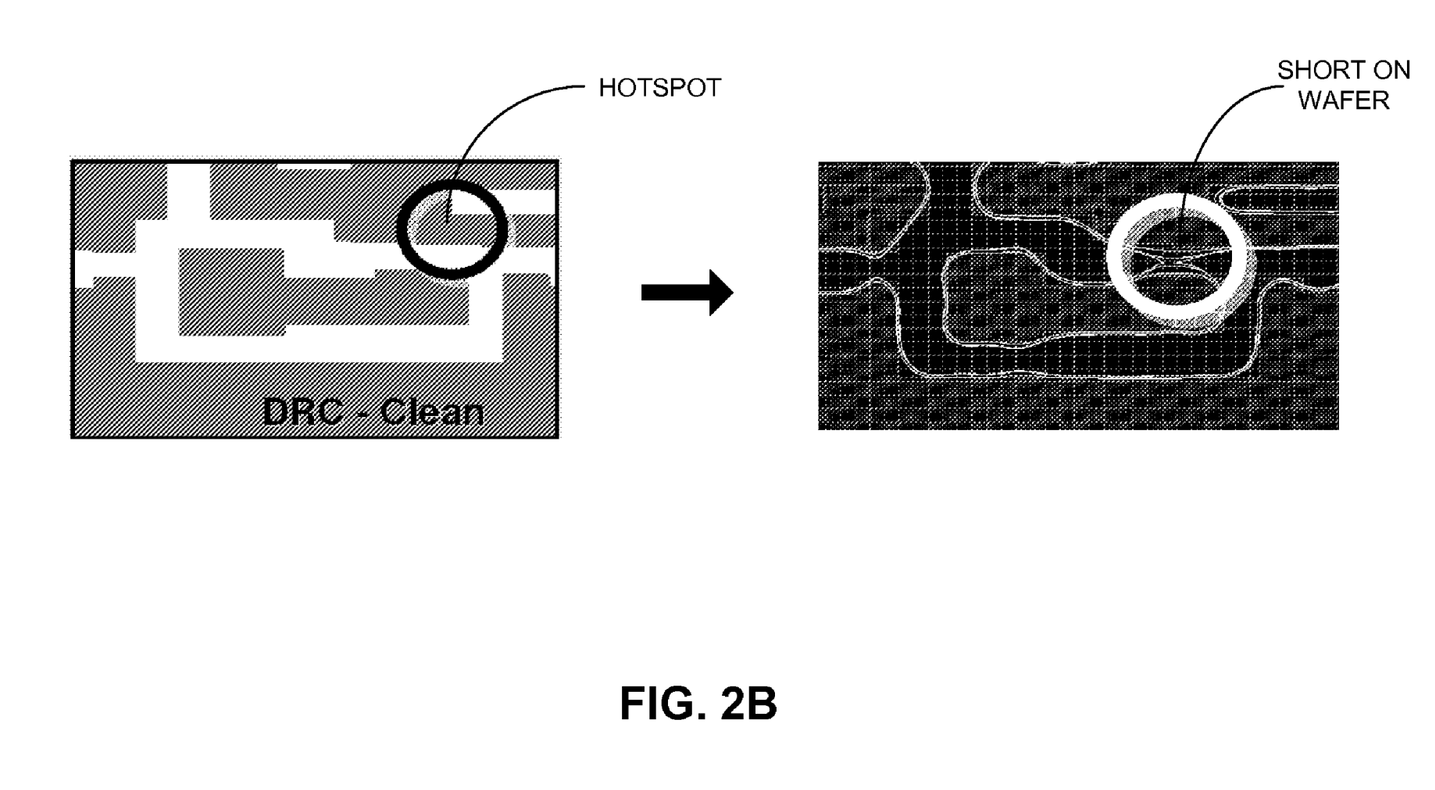
FIG. 2B illustrates an exemplary LCC process for detecting litho-hotspots in accordance with an embodiment of the present invention.

FIG. 2B illustrates an LCC process for detecting litho-hotspots in accordance with an embodiment of the present invention. More specifically, the image on the left shows a DRC-clean design input that has gone through a place-and-route process and an OPC process. The image on the right illustrates the output contour map of a model-based lithographic simulation wherein the contour map indicates a shorting-type litho-hotspot (within the circled region), which is identified through the lithography simulation process. Note that after litho-hotspots have been detected, the system proceeds to correct these litho-hotspots in the layout. By doing this correction early in the IC design flow, the system removes the burden of performing these operations during the later RET/OPC stage.

A Hybrid Process of Correcting an Identified Lithography Hotspot

In one embodiment of the present invention, each identified litho-hotspot within a layout is corrected locally through a hybrid-correction process. More specifically, the hybrid-correction process involves selectively using one of two correction tools: (1) a correction database storing local-correction suggestions to a set of known litho-hotspots; and (2) a routing tool capable of performing local detailed routing to modify a litho-hotspot. In particular, the hybrid process focuses on "fixing" each litho-hotspot individually and locally in the vicinity of the hotspot location without disturbing regions of the design free of litho-hotspots.

Figure 3:
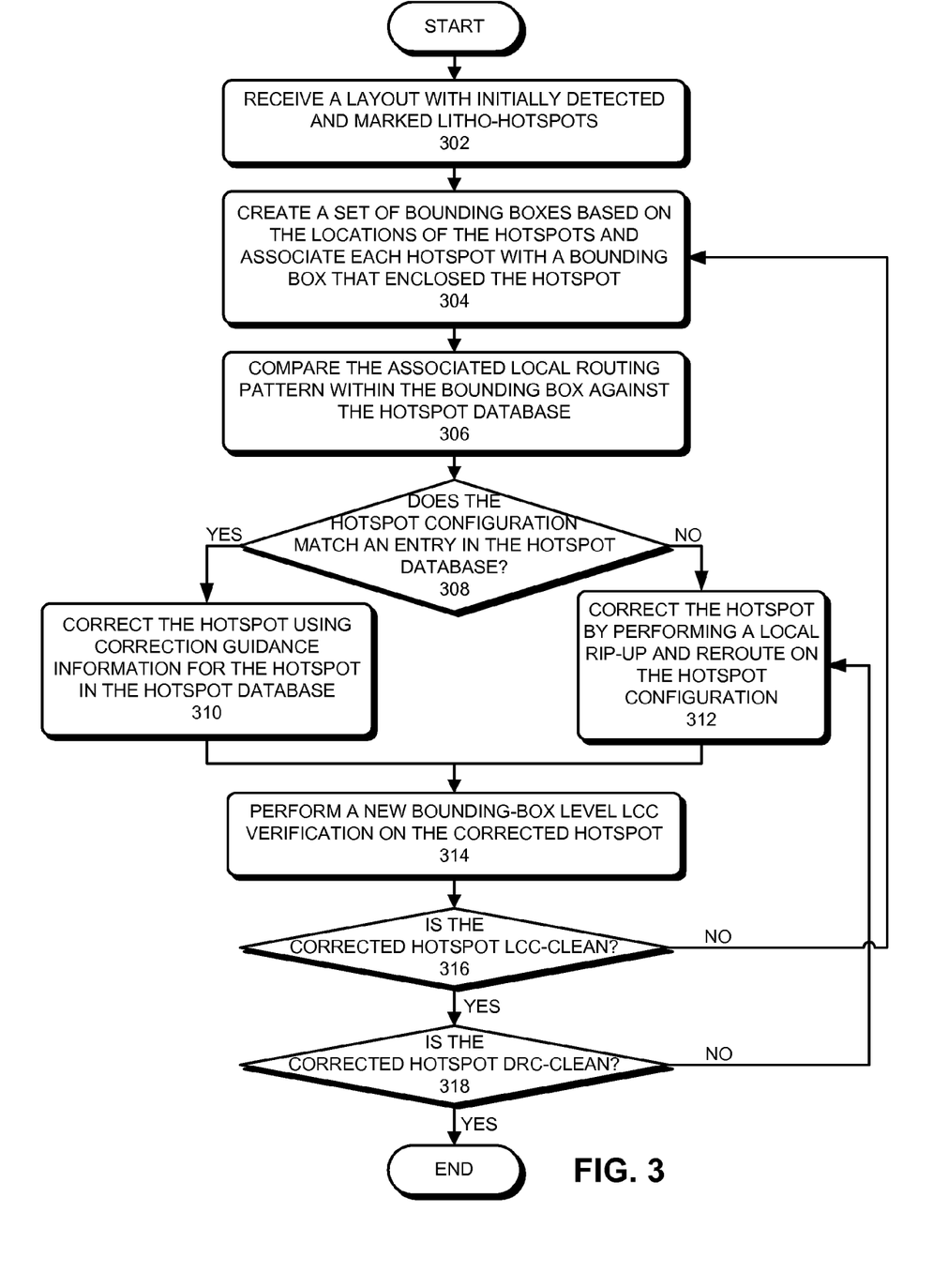
FIG. 3 presents a flowchart illustrating the process of using a hybrid-correction process to correct detected litho-hotspots within a layout in accordance with an embodiment of the present invention.

FIG. 3 presents a flowchart illustrating the process of using a hybrid-correction process to correct detected litho-hotspots within a layout in accordance with an embodiment of the present invention.

During operation, the system receives a layout with initially detected and marked litho-hotspots (step 302). Note that the system may receive the marked layout directly from the full-chip litho-hotspot detection process described in conjunction with FIG. 2.

The system then creates a set of bounding boxes within the layout based on the locations of the set of detected litho-hotspots and associates each detected litho-hotspot with one of the set bounding boxes (step 304). Note that each bounding box is sufficiently large to enclose the associated hotspot and the local routing pattern around the hotspot. Hence, the system generates a set of bounding boxes for the set of detected litho-hotspots. In some embodiments of the present invention, if the layout also includes marked DRC-errors, the partition process also provides a bounding box for each of the DRC-errors.

Note that the overall chip area occupied by these bounding boxes is significantly smaller than the size of the layout (e.g., each bounding box can have a size of about $1 \times 1 \, \mu m^2$). During the subsequent hybrid-correction process, the corrections are only performed on the set of bounding boxes associated with the set of litho-hotspots. Hence, the timing impact on the IC design flow from the correction process is minimized.

Note that a litho-hotspot configuration is essentially a local routing pattern comprising a set of geometries (or polygons) in the proximity of each other, wherein the actual hotspot (e.g., a potential short or an open in a wire) is a very small area surrounded by these polygons. In one embodiment of the present invention, a litho-hotspot database (or "hotspot database" hereafter) is pre-constructed to store a set of known hotspot configurations. In some embodiments, these known hotspot configurations may be provided by manufacturers. Note that in these cases, the litho-hotspots are manufacturer-specific because they are associated with the specific manufacturing tools. Note that a hotspot database can be dynamically updated. More specifically, when a new litho-hotspot is detected from a layout but not found in the hotspot database, a new hotspot entry can be added into the database as a known hotspot configuration for future detection purposes.

Referring back to FIG. 3, for each detected litho-hotspot in the layout, the system then compares the hotspot configuration within the bounding box against the hotspot database (step 306) to determine if the hotspot configuration matches an entry in the hotspot database (step 308). In one embodiment, determining if the litho-hotspot matches an entry in the hotspot database involves performing a pattern-matching operation between the associated local routing pattern and each of the known hotspot configurations in the hotspot database. Note that a suitable pattern-matching technique allows using a known hotspot configuration to identify similar layout patterns that are not precisely identical but can cause the same type of litho-hotspot. In some embodiments, each hotspot configuration in the hotspot database can also include a set of ranges that allow variations of the known hotspot configuration falling into these ranges to be directly identified.

Note that in addition to storing hotspot patterns, the hotspot database can also store correction guidance information for each known hotspot pattern, wherein the correction guidance information can include a set of correction recommendations or solutions for the associated hotspot pattern. In one embodiment of the present invention, the correction guidance information may be generated through a pattern perturbation process. More details of the process of perturbing a hotspot pattern to determine the correction guidance information are provided in U.S. patent application Ser. No. 12/109,118, entitled "Pattern-Clip-Based Hotspot Database System for Layout Verification," by inventors Zongwu Tang, et al., filed on 24 Apr. 2008, which is hereby incorporated by reference. However, other techniques can be used to generate the correction guidance information for the stored hotspots, for example, by using intelligent heuristics or through trial and error.

Note that the capability of generating correction guidance information for each litho-hotspot can be integrated with the hotspot detection tool. In this embodiment, each time a new litho-hotspot (configuration) is detected, the LCC tool uses an internal module to obtain correction recommendations for the hotspot. Next, the LCC tool stores the correction guidance information along with the associated hotspot configuration as an entry in the hotspot database.

Again referring back to FIG. 3, if a match is found between a database entry and the litho-hotspot, the system then corrects the litho-hotspot using correction guidance information associated with the hotspot configuration stored in the hotspot database (step 310). Note that this correction specifically targets the hotspot configuration inside the associated bounding box. We refer to this correction technique as a "database-driven local correction." More details of this database-driven local-correction technique are provided below.

On the other hand, if no match can be found between any database entry and the detected litho-hotspot (i.e., an unrecognized hotspot configuration), the system alternatively corrects the litho-hotspot by performing a local rip-up and reroute on the litho-hotspot configuration (step 312). More specifically, this router-based correction process involves using a routing tool to rip up wires in the proximity of the hotspot and reroute the hotspot configuration. For example, the system can use a conventional detailed router capable of performing a standard rip-up and reroute on the local routing pattern associated with the litho-hotspot. Note that the router-based correction is also a "local-correction" process. More details of the local-routing technique using a router are provided below.

Note that the above-described hybrid-correction process selects one of the two local-correction techniques based on whether the litho-hotspot has a known configuration. If so, the predetermined corrections on the hotspot can be directly retrieved from the hotspot database, which facilitates a rapid hotspot correction. Otherwise, a more conventional router approach is applied to the hotspot, which is typically more time consuming because there is no guarantee of a instant hotspot fix from a conventional router perspective.

Note that one advantage of the router-based correction technique is that the correction process can be fully automated from start to finish. In some cases, no manual interaction is needed from the designer during the correction process. However, in comparison to the database-driven correction technique, the router-based technique typically involves more changes to the layout. This can be the case even when some intelligence has been built into the flow to select a minimal number of wires for rerouting. Also note that during rip-up and reroute, new litho-hotspot formation is more likely to occur than for the database-driven technique. This problem may be solved through an automated iterative process which facilitates convergence to hotspot-removal, which is described below.

In contrast, the database-driven correction technique can keep layout changes to a minimum, so the timing impact on the corrected layout may be neglected. Furthermore, because the hotspot correction involves using deterministic correction guidance information, the possibility of new hotspot formation is significantly lower in the database-driven technique than the router-based technique.

On the other hand, because the database-driven technique typically requires using intelligent heuristics to build up the hotspot configuration and correction database, there is a set up time involved with this technique. However, as new hotspot configurations are found and added to the database, the likelihood of recognizing a newly detected hotspot increases as the database continues to grow.

Iterative Correction Process to Achieve LCC and DRC Convergence

Note that neither of the two hotspot-correction techniques can guarantee hotspot "removal" after a single correction step. Furthermore, these local corrections can affect layout patterns adjacent to the bounding box enclosing the hotspot. In other words, new litho-hotspots and/or new DRC errors may be generated from the layout pattern modification. Consequently, embodiments of the present invention perform the hotspot correction in an iterative manner, so that litho-hotspots may be corrected incrementally to allow the layout to gradually converge to a hotspot-clean state.

Referring back to FIG. 3, after the hybrid-correction process has been performed on the litho-hotspot, the system performs a new bounding-box level LCC verification on the corrected litho-hotspot (step 314) to determine if the corrected litho-hotspot is LCC-clean (step 316). In some embodiments of the present invention, neighboring routing configurations are also checked to determine if any new hotspot has been generated as the result of the changes to the local routing pattern.

If the LCC verification determines that the corrected hotspot is not LCC clean, or one or more new hotspots have been generated, the system returns to step 304, so that a new cycle of iteration starts with partitioning the layout according to the remaining litho-hotspots in the layout. Otherwise, the hybrid-correction process is successful and the bounding box is LCC clean.

The system then performs a rule-based DRC detection within the same bounding box to determine if the corrected hotspot is also DRC-clean (i.e., free of hotspot-induced DRC violations) (step 318). If so, the bounding box is unmarked, and removed from the correction flow. Otherwise, the system returns to step 312, so that a new cycle of iteration starts with a rip-up and reroute operation on the bounding box containing DRC-violations. Note that the system does not have to return to step 304 because the hotspot has been corrected for the bounding box at this stage.

In some embodiments of the present invention, the system does not return to step 312 if the bounding box is determined to be not DRC-clean. Instead, the system first determines if the hotspot correction was performed by using the correction guidance information from the hotspot database (i.e., the hotspot is a database-recognizable hotspot). If so, the system returns to step 310 from step 318. Note that this is possible because the correction guidance information can include multiple correction solutions for each stored litho-hotspot. More specifically, after returning to step 310, the system rejects the existing changes which has been made to the litho-hotspot, thereby restoring the bounding box to the original hotspot configuration. Next, the system selects a new correction solution from the corresponding correction guidance information, and subsequently corrects the litho-hotspot using this correction solution. Note that in these embodiments, each hotspot may go through multiple database-driven local-corrections to become both LCC-clean and DRC-clean.

Note that the correction flow after layout partition step 304 may be performed in a parallel process for each bounding box in the set of bounding boxes (i.e., for each detected litho-hotspot). In one embodiment of the present invention, each partition, or bounding box, is distributed to different threads/CPUs for parallel processing. After each round of correction, one or more bounding boxes may become both LCC-clean and DRC-clean, so that they can be removed from further processing. The remaining hotspots, new hotspots and DRC violations are collected by the system and re-enter the iteration process as described above. The correction flow iterates until all hotspots are corrected and no new DRC errors remain in the layout.

An Exemplary Local-Correction using a Hotspot Database

Recall that the database-driven local-correction technique uses predetermined correction guidance information to fix a matched litho-hotspot. More specifically, the predetermined correction guidance information is configured to introduce new positions for one or more polygons within the local routing pattern around the associated hotspot. As a result, a new routing pattern around the litho-hotspot is formed after the local correction. Note that while modifying the local routing pattern for the hotspot, the local-correction technique is also configured to maintain signal connectivity. In some embodiments, the local-correction tool is also capable of preventing DRC violations when performing hotspot corrections.

Figure 4A:
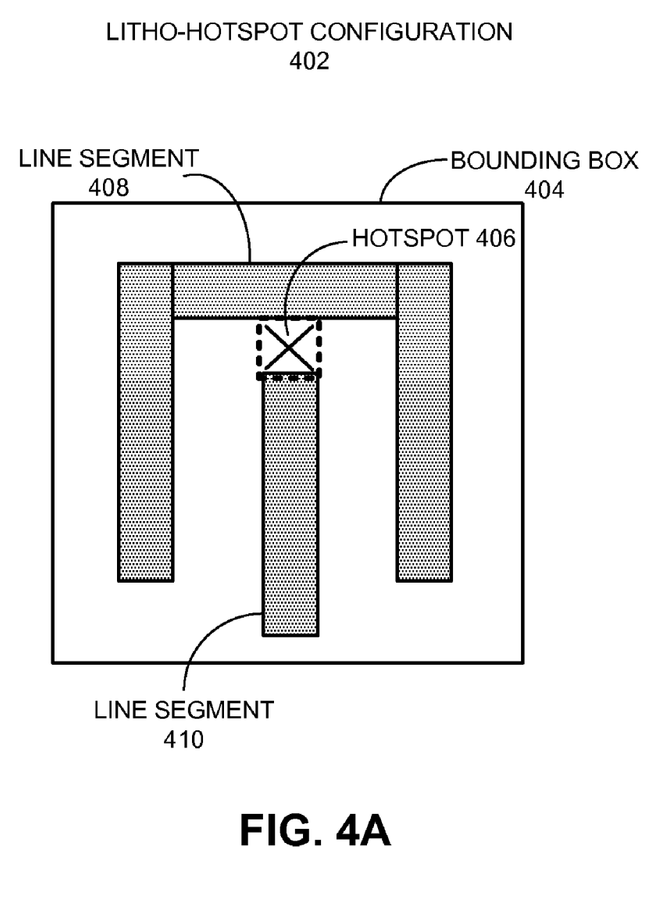
FIG. 4A illustrates an exemplary litho-hotspot configuration enclosed by a bounding box in accordance with an embodiment of the present invention.
Figure 4B:
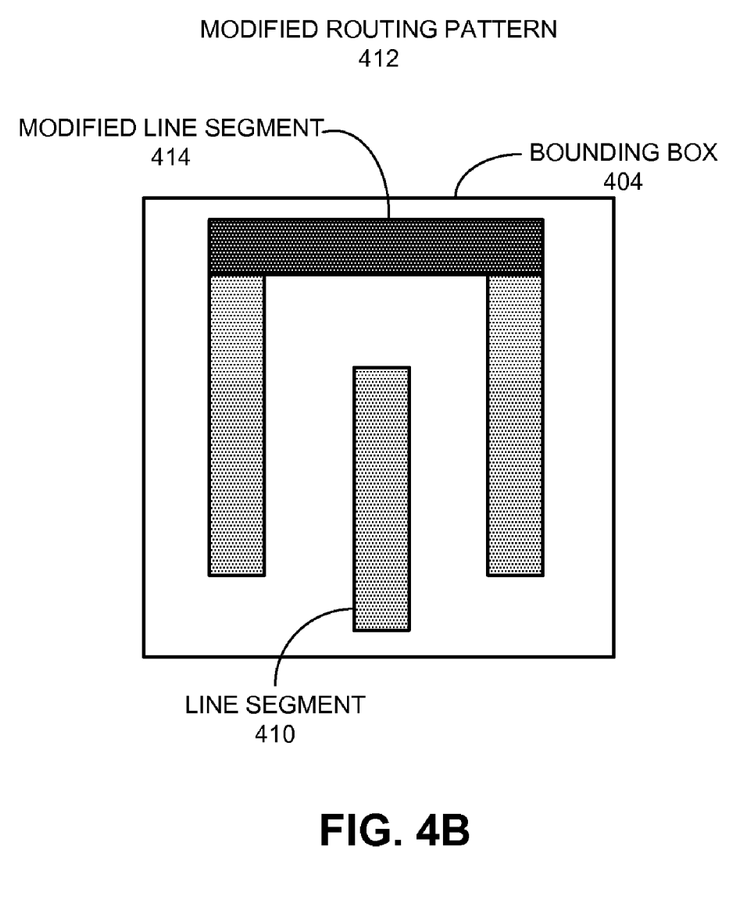
FIG. 4B illustrates the process of correcting the litho-hotspot of FIG. 4A using known correction guidance information in accordance with an embodiment of the present invention.

FIG. 4A illustrates an exemplary litho-hotspot configuration 402 enclosed by a bounding box 404 and FIG. 4B illustrates the process of correcting this hotspot using known correction guidance information in accordance with an embodiment of the present invention. More specifically, FIG. 4A illustrates a shorting-hotspot 406 located between a horizontal line segment 408 and a vertical line segment 410 in accordance with an embodiment of the present invention. Note that to use the database-driven local-correction technique, litho-hotspot configuration 402 should match a stored hotspot configuration in the hotspot database.

FIG. 4B illustrates a modified routing pattern 412 according to predetermined correction guidance information in accordance with an embodiment of the present invention. As illustrated in FIG. 4B, the original line segment 408 is moved to a new position as modified line segment 414 to increase the distance from line segment 410, thereby eliminating shorthotspot 406. Also note that the correction has maintained the signal connectivity in the original configuration 402 by adding line end extensions to the modified line segment 414. Note that in addition to using distance increase as a type of correction guidance, other types of correction guidance can include, but are not limited to, line-end extensions, reductions, polygon shape modification, creating new polygons, removing existing polygons, among others.

An Exemplary Router-Based Hotspot Correction Process

Figure 5:
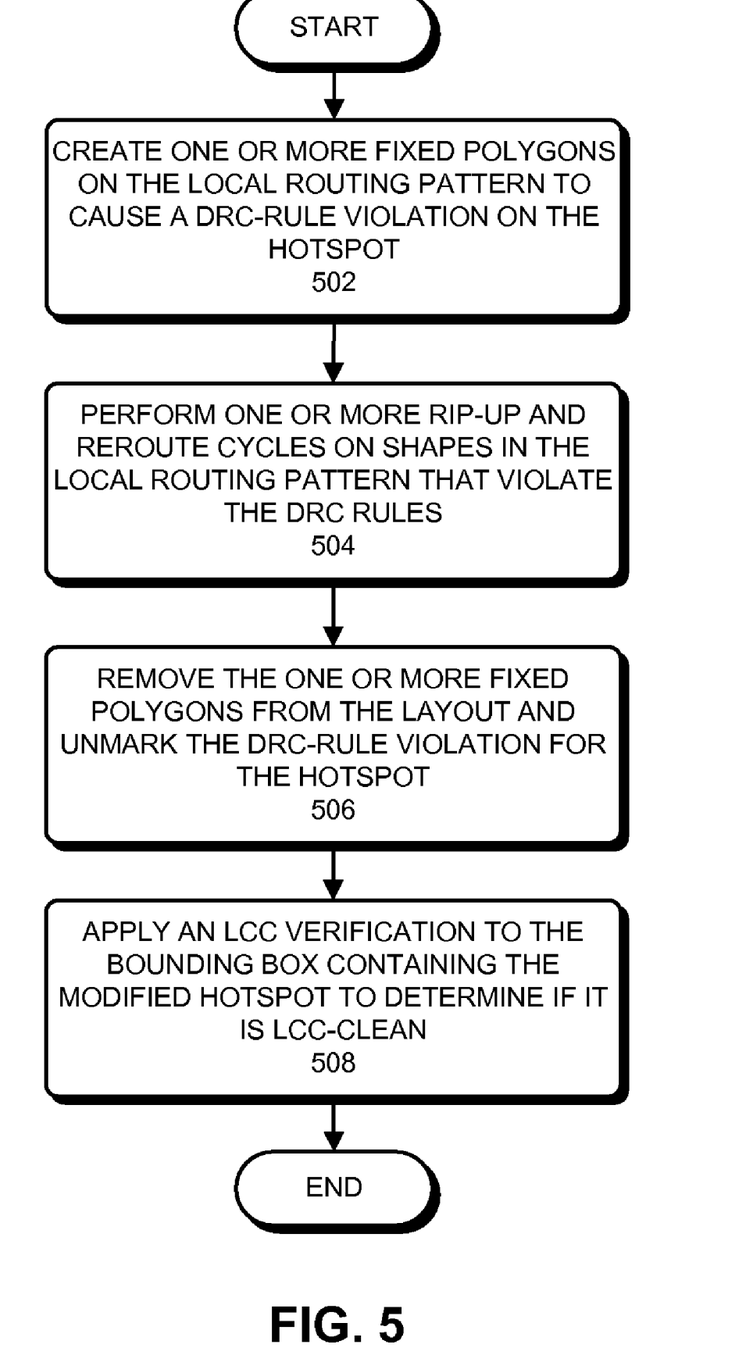
FIG. 5 presents a flowchart illustrating the process of a router-based local-correction on a litho-hotspot in accordance with an embodiment of the present invention.

During the hybrid hotspot-correction process, router-based local-correction is performed when the hotspot does not match any known hotspot configuration. More specifically, FIG. 5 presents a flowchart illustrating the process of a router-based local-correction on a litho-hotspot in accordance with an embodiment of the present invention.

During operation, the router-based correction tool first creates one or more fixed polygons on the local routing pattern to cause a DRC-rule violation on the hotspot (step 502). For example, in the litho-hotspot configuration in FIG. 4A, the correction tool can add a "fake" rectangular box over hotspot 406 thereby causing DRC-rule violations on both line segments 408 and 410.

The correction tool then performs standard rip-up and reroute on shapes in the local routing pattern that violate the DRC rules (step 504). In the above example, both segments 408 and 410 may be marked for this operation. Note that one or more rip-up and reroute cycles may be performed on the hotspot. Also note that the rip-up and reroute is typically performed within a switch box (or bounding box) which encloses the litho-hotspot and the wires around the litho-hotspot.

After one or more iterations of local wire rerouting, the correction tool removes the one or more fixed polygons from the layout and subsequently unmarks the DRC-rule violation for the hotspot (step 506), because the local routing pattern around the original hotspot has been changed. Next, the LCC verification is applied to the bounding box containing the modified hotspot to determine if it is LCC-clean (step 508). In some embodiments, neighboring configurations are also checked by the LCC tool to determine if any new hotspot is generated due to the reroute process.

Note that the above-described process of FIG. 5 can be made fully automatic by integrating the process with a conventional place-and-route tool, such as an IC-Compiler® (ICC).

CONCLUSION

Embodiments of the present invention provide a hybrid correction system which combines the rule-based correction and model-based guided correction and verification for the detected litho-hotspots within a layout. Each time the corrections are made to the hotspots, the system performs a local LCC and DRC checking for changed routing patterns near the locations of the hotspots and records remaining litho-hotspots and DRC violations. The system iteratively performs correction and detection until all litho-hotspots are DRC violations are cleaned.

Note that although the present invention is described in terms of detecting and correcting lithography hotspots, the present invention is not meant to be limited to the lithography hotspots. In general, the concept and embodiments of using the hybrid local-correction process in conjunction with an iterative correction flow to incrementally achieving a hotspot-free layout can be applied to correcting any other type of process-hotspot in a layout, which can include, but are not limited to, mechanical stress-hotspots and other proximity-based hotspots.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for verifying an integrated circuit (IC) chip layout, the method comprising:
    receiving a layout of an IC chip after the layout has gone through a place-and-route operation;
    performing a lithography compliance checking (LCC) operation on the layout to detect lithography hotspots within the layout, wherein each lithography hotspot is associated with a local routing pattern around the lithography hotspot; associating each detected lithography hotspot with a bounding box which encloses the associated local routing pattern; and
    for each detected lithography hotspot, comparing, by computer, the associated local routing pattern against a hotspot database to determine if the local routing pattern matches an entry in the hotspot database, which stores both a set of known hotspot configurations and correction guidance information associated with each hotspot configuration in the set of known hotspot configurations, and:
        if a match is found, correcting the lithography hotspot using the correction guidance information associated with the hotspot configuration stored in the hotspot database,
        otherwise, correcting the lithography hotspot by performing a local rip-up and reroute on the local routing pattern.

2. The method of claim 1, wherein the method further comprises:
    generating a set of bounding boxes within the layout based on locations of the detected lithography hotspots and locations of existing design-rule checking (DRC) violations.

3. The method of claim 1, wherein determining if the lithography hotspot matches an entry in the hotspot database involves performing a pattern-matching operation between the associated local routing pattern and each of the known hotspot configurations in the hotspot database.

4. The method of claim 1, wherein correcting the lithography hotspot using the correction guidance information involves:
    identifying one or more polygons within the associated local routing pattern which cause the lithography hotspot; and
    modifying the polygons to form a new routing pattern around the lithography hotspot while maintaining signal connectivity of the layout.

5. The method of claim 1, wherein while correcting the lithography hotspot using the correction guidance information, the method further comprises performing a design-rule checking (DRC) operation on the new routing pattern to prevent DRC violations resulting from the correction.

6. The method of claim 4, wherein modifying the polygons to form the new routing pattern can involve:
    modifying the positions of the polygons;
    modifying the sizes of the polygons;
    creating one or more new polygons; and
    removing one or more of the existing polygons.

7. The method of claim 1, wherein correcting the lithography hotspot by performing the local rip-up and reroute on the local routing pattern involves:
    creating one or more fixed polygons in the local routing pattern to cause a DRC-rule violation on the lithography hotspot;
    using a router to perform one or more rip-up and reroute cycles on shapes in the local routing pattern that violate the DRC rules;
    removing the one or more fixed polygons; and
    unmarking the DRC-rule violation on the rerouted local routing pattern.

8. The method of claim 2, wherein after correcting the lithography hotspot using either the correction guidance information or by performing the local rip-up and reroute, the method further comprises:
    performing a new LCC operation within the bounding box containing the corrected lithography hotspot to determine if the bounding box is free of lithography hotspots:
        if so, marking the bounding box as an LCC-clean region which does not contain a lithography hotspot;
        otherwise, initiating a new lithography hotspot correction cycle for each remaining lithography hotspot within the bounding box.

9. The method of claim 8, wherein after marking the bounding box as an LCC-clean region, the method further comprises performing a DRC operation on the bounding box to determine if the bounding box is DRC-clean:
    if so, marking the bounding box as a DRC-clean region;
    otherwise, repeating the local rip-up and reroute operation on the bounding box.

10. The method of claim 1, wherein the method is performed iteratively to allow an incremental correction on the lithography hotspot until the lithography hotspot is removed from the layout.

11. The method of claim 1, wherein the method further comprises performing parallel correction operations on multiple detected lithography hotspots.

12. A non-transitory computer-readable storage medium storing instructions that when executed by a computer cause the computer to perform a method for verifying an integrated circuit (IC) chip layout, the method comprising:
    receiving a layout of an IC chip after the layout has gone through a place-and-route operation;
    performing a lithography compliance checking (LCC) operation on the layout to detect lithography hotspots within the layout, wherein each lithography hotspot is associated with a local routing pattern around the lithography hotspot; associating each detected lithography hotspot with a bounding box which encloses the associated local routing pattern; and
    for each detected lithography hotspot, comparing the associated local routing pattern against a hotspot database to determine if the local routing pattern matches an entry in the hotspot database, which stores both a set of known hotspot configurations and correction guidance information associated with each hotspot configuration in the set of known hotspot configurations, and:
        if a match is found, correcting the lithography hotspot using the correction guidance information associated with the hotspot configuration stored in the hotspot database,
        otherwise, correcting the lithography hotspot by performing a local rip-up and reroute on the local routing pattern.

13. The computer-readable storage medium of claim 12, wherein the method further comprises:

generating a set of bounding boxes within the layout based on locations of the detected lithography hotspots and locations of existing design-rule checking (DRC) violations.

14. The computer-readable storage medium of claim 12, wherein determining if the lithography hotspot matches an entry in the hotspot database involves performing a pattern-matching operation between the associated local routing pattern and each of the known hotspot configurations in the hotspot database.

15. The computer-readable storage medium of claim 12, wherein correcting the lithography hotspot using the correction guidance information involves:
    identifying one or more polygons within the associated local routing pattern which cause the lithography hotspot; and
    modifying the polygons to form a new routing pattern around the lithography hotspot while maintaining signal connectivity of the layout.

16. The computer-readable storage medium of claim 12, wherein while correcting the lithography hotspot using the correction guidance information, the method further comprises performing a DRC operation on the new routing pattern to prevent DRC violations resulting from the correction.

17. The computer-readable storage medium of claim 15, wherein modifying the polygons to form the new routing pattern can involve:
    modifying the positions of the polygons;
    modifying the sizes of the polygons;
    creating one or more new polygons; and
    removing one or more of the existing polygons.

18. The computer-readable storage medium of claim 12, wherein correcting the lithography hotspot by performing the local rip-up and reroute on the local routing pattern involves:
    creating one or more fixed polygons in the local routing pattern to cause a DRC-rule violation on the lithography hotspot;
    using a router to perform one or more rip-up and reroute cycles on shapes in the local routing pattern that violate the DRC rules;
    removing the one or more fixed polygons; and
    unmarking the DRC-rule violation on the rerouted local routing pattern.

19. The computer-readable storage medium of claim 13, wherein after correcting the lithography hotspot using either the correction guidance information or by performing the local rip-up and reroute, the method further comprises:
    performing a new LCC operation within the bounding box containing the corrected lithography hotspot to determine if the bounding box is free of lithography hotspots:
        if so, marking the bounding box as an LCC-clean region which does not contain a lithography hotspot;
        otherwise, initiating a new lithography hotspot correction cycle for each remaining lithography hotspot within the bounding box.

20. The computer-readable storage medium of claim 19, wherein after marking the bounding box as an LCC-clean region, the method further comprises performing a DRC operation on the bounding box to determine if the bounding box is DRC-clean:
    if so, marking the bounding box as a DRC-clean region;
    otherwise, repeating the local rip-up and reroute operation on the bounding box.

21. The computer-readable storage medium of claim 12, wherein the method is performed iteratively to allow an incremental correction on the lithography hotspot until the lithography hotspot is removed from the layout.

22. The computer-readable storage medium of claim 12, wherein the method further comprises performing parallel correction operations on multiple detected lithography hotspots.

23. A system that verifies an integrated circuit (IC) chip layout, comprising:
    a receiving mechanism configured to receive a layout of an IC chip after the layout has gone through a place-and-route operation;
    a performing mechanism configured to perform a lithography compliance checking (LCC) operation on the layout to detect lithography hotspots within the layout, wherein each lithography hotspot is associated with a local routing pattern around the lithography hotspot associating each detected lithography hotspot with a bounding box which encloses the associated local routing pattern;
    a comparison mechanism configured to compare the local routing pattern associated with each detected lithography hotspot against a hotspot database to determine if the local routing pattern matches an entry in the hotspot database, which stores both a set of known hotspot configurations and correction guidance information associated with each hotspot configuration in the set of known hotspot configurations;
    a first correction mechanism configured to, in response to determining that the local routing pattern matches an entry in the hotspot database, correct the lithography hotspot using correction guidance information associated with the hotspot configuration stored in the hotspot database; and
    a second correction mechanism configured to, in response to determining that the local routing pattern does not match any entries in the hotspot database, correct the lithography hotspot by performing a local rip-up and reroute on the local routing pattern.

24. The system of claim 23, wherein the second correction mechanism is configured to:
    create one or more fixed polygons in the local routing pattern to cause a DRC-rule violation on the lithography hotspot;
    use a router to perform one or more rip-up and reroute cycles on shapes in the local routing pattern that violate the DRC rules;
    remove the one or more fixed polygons; and
    unmark the DRC-rule violation on the rerouted local routing pattern.

* * * * *